Nov. 11, 1969  F. J. DE COENE  3,477,599
UNLOADING DEVICE FOR COMBINES
Filed Dec. 18, 1967  3 Sheets-Sheet 1
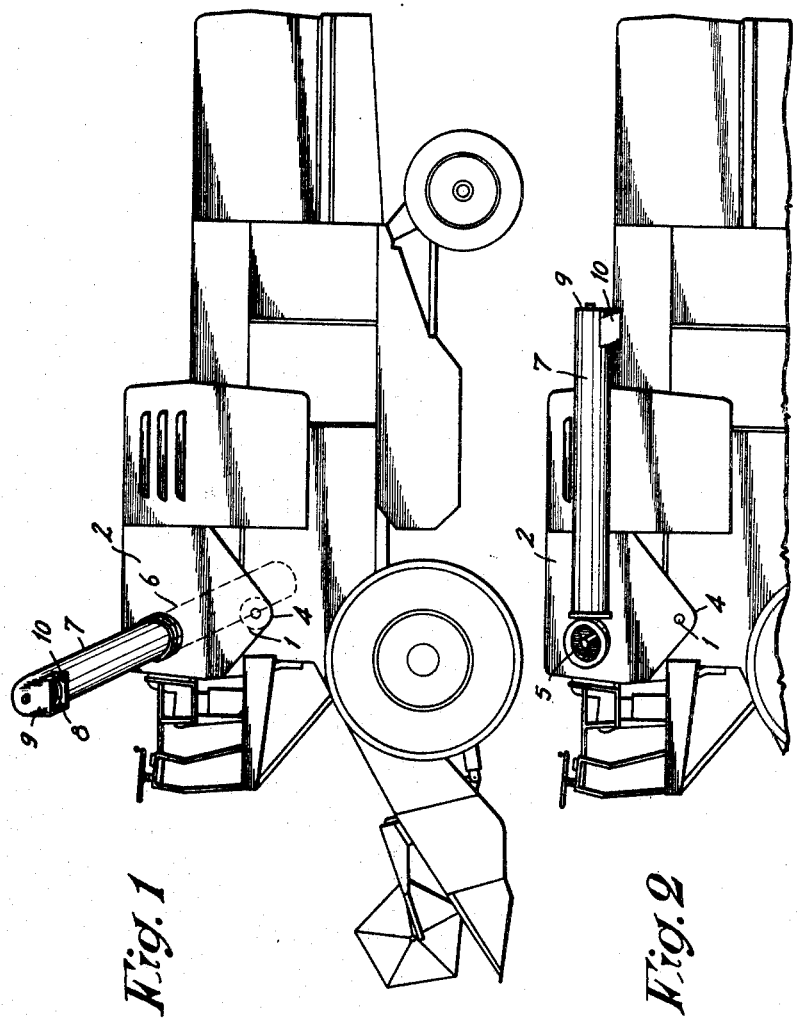
INVENTOR.

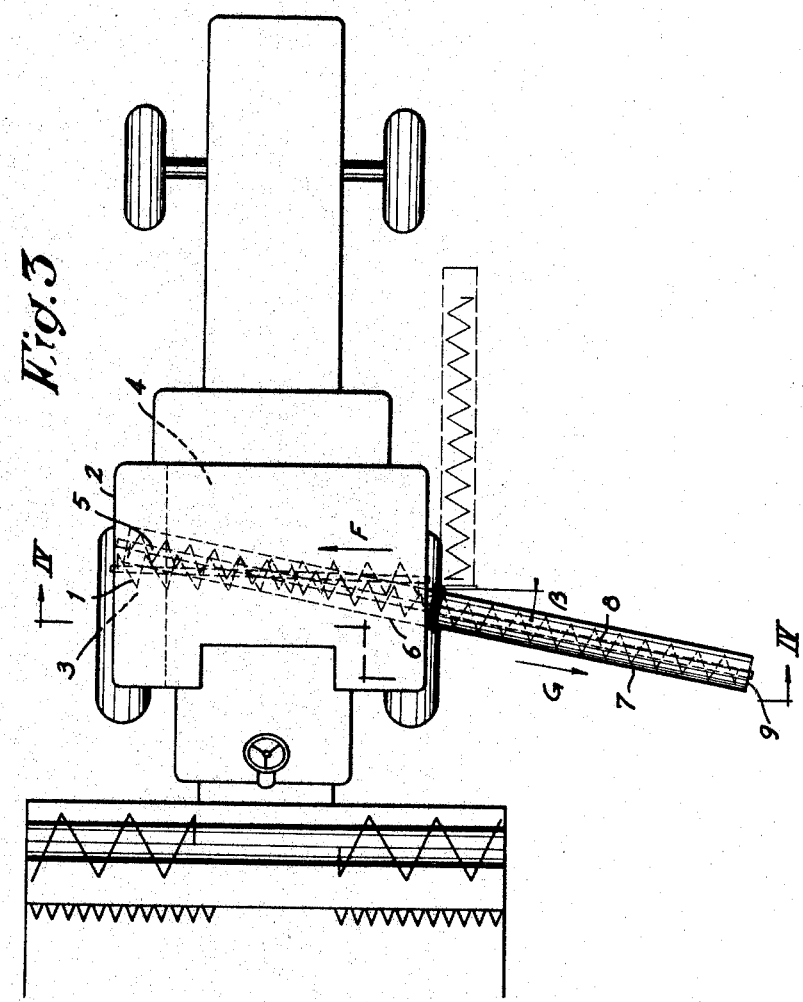

Nov. 11, 1969    F. J. DE COENE    3,477,599
UNLOADING DEVICE FOR COMBINES
Filed Dec. 18, 1967    3 Sheets-Sheet 2

INVENTOR.

United States Patent Office 3,477,599
Patented Nov. 11, 1969

3,477,599
UNLOADING DEVICE FOR COMBINES
Frans J. De Coene, Zedelgem, Belgium, assignor to Clayson N.V., Zedelgem, Belgium, a company of Belgium
Filed Dec. 18, 1967, Ser. No. 691,612
Claims priority, application Belgium, Apr. 3, 1967, 46,703, Patent 696,478
Int. Cl. B60p 1/40; A01d 90/00
U.S. Cl. 214—519                                    4 Claims

ABSTRACT OF THE DISCLOSURE

Improved device for unloading combines, comprising two coaxially mounted spiral conveyors, one of which located within the collecting tank of the combine and the other outside of said tank.

---

The present invention concerns an improved device for unloading combines.

In heretofore known combines, the unloading of the graintank for mowed and threshed grains is effectuated by a conveyor which is generally formed by a spiral conveyor, this conveyor being generally mounted on the bottom of the graintank to convey the grain sidewards to an opening provided near the basis of one of the sidewalls of said tank.

A so called unloading pipe also equipped with a spiral conveyor may cooperate with the above mentioned opening, and when this unloading pipe is in operative position, that is when it is connected with the above mentioned opening, it is slanted with respect to a horizontal plan.

This slant angle is determined in function of the length of the unloading pipe and the heigth at which the end of this unloading pipe must be from the ground, this height being such that even rather high trucks can drive under the unloading pipe so that these trucks may be loaded up from the contents of aforesaid tank.

A first disadvantage of these known unloading devices is that, as the above mentioned transport device is mounted horizontally in the tank and that the above mentioned unloading pipe has to cooperate with this horizontal transport device under a relatively large angle, a special coupling should be provided between the latter and the transport device of the unloading pipe, such couplings being very expensive.

Another disadvantage of such a construction is that total discharge output is adversely affected due to the mandatory use of the above mentioned coupling between the transport device of the graintank and the transport device of the auger flighting, because it seldom occurs that said two conveying means are exactly driven at the same speed.

Still another disadvantage of the known devices is that the total output of the unloading pipe is adversely affected by the increase of the angle of slant said pipe defines with the horizontal.

The object of the present invention is to provide an improved unloading device for combines which does not show the hereabovementioned disadvantages.

The device according to this invention substantially comprises a slanting conveying device located in a collecting tank, a second slanting conveying device located outside of said tank and in exact alignment with said first conveying device and, within said tank, means to move the grain towards the lower extremity of said first conveying means. Other objects and characteristics of the present invention will more clearly appear from the following detailed description of one preferred embodiment of the present invention, given only by way of illustration, with reference to the appended drawings in which:

FIGURE 1 is a side elevation of a combine embodying a device according to this invention, in operative position;

FIGURE 2 is a fragmentary view, similar to that of FIGURE 1, in which the device occupies an unoperative or road position;

FIGURE 3 is a schematical top view of the combine shown in FIGURE 1;

Figure 4:
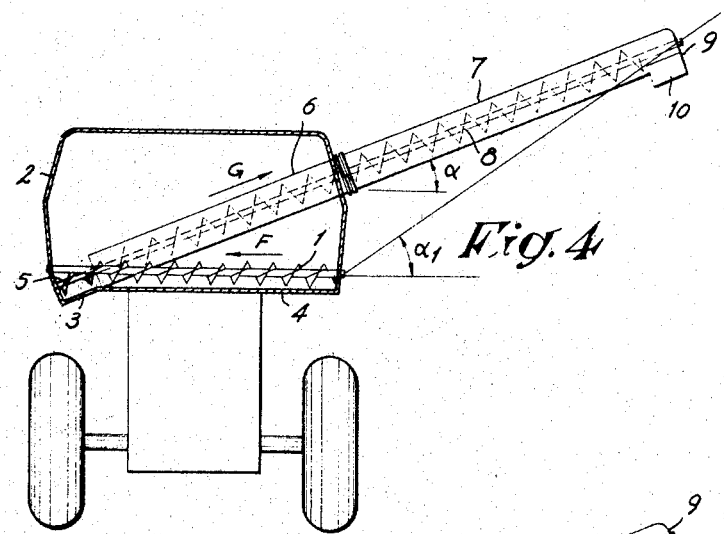
FIGURE 4 is a schematical section alongst line IV—IV of FIGURE 3.

In the execution according to FIGURES 1–4, the device according to this invention comprises one or more spiral conveyors 1, one of which being particularly shown, which are driven by any suitable devices (not shown) so as to move the grain or similar products contained within a tank 2 in the direction indicated by arrow F so as to continuously displace said grain towards the corresponding side of the tank, the bottom 4 of the latter being provided at this side, with a sunk portion 3. This sunk portion forms a trough from which departs an upwardly slanted conveyor 5 located within a pipe 6 and constituted by an Archimedean screw.

The lower extremity of pipe 6 is located at a determined distance from the corresponding side of the tank to form with said through 3, an infeed passage to pipe 6. The latter is further provided with openings (not shown) through which the grain may penetrate into the pipe, so that this pipe has almost no influence on the capacity of the tank.

Outside of the collecting tank 2, a pipe 7 is provided which is hingedly fixed to the combine itself and in such a way that said pipe 7, which is the actual unloading pipe, can be brought and kept in at least two positions, respectively the operative position as shown in full lines on FIGURE 3 and the unoperative or road position, as shown in chain line on the same FIGURE 3.

This pipe 7 also houses a helicoid conveyor 8 the pitch of which being preferably the same as that of the spiral conveyor 5. Neither the drive of the spiral conveyor 5 nor that of conveyor 8 are shown in the drawings but they can be set up in any appropriate way for instance by means of a connection with the driving engine of the combine.

Preferably the lower end of conveyor 5 will be driven from outside the tank 2 and a simple coupling will be provided between the shafts of conveyors 5 and 8 to drive conveyor 8.

Pipe 7 is provided towards its upper free end with a sealing plate 9 delimiting a downwardly facing opening through which the grain is expelled.

The working of this unloading device is very simple.

The grain contained within the tank 2 is moved by the above mentioned transport device 1 in the direction indicated by arrow F to the immediate vicinity of the inlet of pipe 6 where it is picked up by conveyor 5 and next by conveyor 8, moved through said pipes 6 and 7, in the direction indicated by arrow G, to be expelled through said opening 10 to be loaded in a container, a truck or similar.

It is thus possible to align the unloading pipe 7 and the inner unloading pipe 6 so that a simple and inexpensive coupling between said two pipes can be used. Furthermore, the output of such an unloading device is very favourable because the spiral conveyors 5 and 8 can thus be driven at exactly the same uniform speed, and because the slope angle α of pipes 6 and 7 is much smaller than on the unloading devices as used heretofore.

Indeed, to have the opening 10 at the same height as shown in the drawings in the devices known up to now, the lower extremity of the discharge pipe should be, at the discharge side of the tank, at the level of the shaft of spiral conveyor 1, which means that the slope angle of said pipe would be prohibitively large, as indicated by $\alpha_1$ on FIGURE 4.

Figure 5:
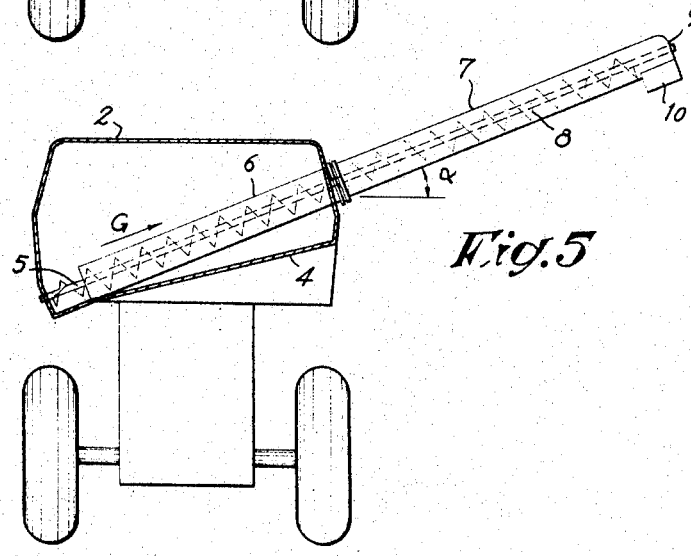
FIGURE 5 is a view, similar to that of FIGURE 4, of an alternative embodiment.

Finally FIGURE 5 shows a slightly different execution from that according to FIGURES 1 to 4, in that the bottom 4 is slanted, its lowest part being located under the inlet opening of pipe 6.

In this case the grain will normally flow to the lowest part of the tank 2 where it will be taken up by the spiral conveyor 5 to be further conveyed by spiral conveyor 8 in the direction indicated by arrow G, so as to be expelled through opening 10 to be loaded in a conveyor or truck.

In certain cases even a tank with a horizontal bottom could be used combined with pipes 6–7, respectively with the spiral conveyors 5–8, suitable vibratory devices being then provided to displace the grain in the desired direction.

In the above described executions, the axis of unloading pipe 7 and as a consequence that of pipe 6 are in a plane which is not perpendicular to the lengthwise direction of the combine, but which forms a well determined angle $\beta$ with it, so that the free end 10 of the above mentioned pipe 7 is located in full view of the driver of the combine, so that the latter may visually control the unloading operations without leaving his seat.

The present invention is not limited to the example described hereabove and shown in the drawings, but can be executed in all shapes and dimensions.

What I claim is:

1. In a combine for harvesting and separating grain,
a combine operating means at the front and upper portion of said combine,
a tank for holding grain mounted to the rear of the operating means on the upper portion of said combine and having a side wall on one side of said combine and a bottom wall,
said tank having an upper portion spaced from said bottom wall and on the opposite side of said tank from said side wall,
means for delivering grain towards and adjacent to said first side wall,
a straight conveyor having a straight pipe with a straight shaft bearing a straight auger and with an intake at one end and a discharge at the other end,
said conveyor extending at a constant upward angle from said first side wall and said bottom wall through said upper portion exteriorly to said tank with said pipe discharge horizontally spaced from said tank in an elevated position for conveying grain away from said side wall in a direction opposite to the direction of feed by said delivery means,
said intake at said bottom and first side wall and said shaft extending through said side wall for connection to a drive means for rotating said auger to feed grain into and through said straight pipe for discharge into a high grain receiving conveyance beside said combine under said discharge.

2. In a combine as set forth in claim 1 wherein said upper portion is the upper part of a second side wall on the opposite side of said tank and combine from said first side wall.

3. In a combine as set forth in claim 1 wherein said conveyor is at a forward angle to position said discharge forwardly of said intake and to the side of said combine operating means.

4. In a combine as set forth in claim 1 wherein said auger is continuous from said first wall to said discharge.

References Cited

UNITED STATES PATENTS

| | | | |
|---|---|---|---|
| 2,405,727 | 8/1946 | Aaberg | 214—83.32 |
| 2,410,996 | 11/1946 | Patterson | 214—521 |
| 2,612,294 | 9/1952 | Dorschner | 214—83.32 X |
| 2,772,767 | 12/1956 | Seifert | 214—83.26 X |
| 2,991,895 | 7/1961 | Dietzenbach | 214—522 |
| 3,265,226 | 8/1966 | Malcolm | 214—519 X |
| 3,331,519 | 7/1967 | Jennings | 214—522 X |
| 3,363,806 | 1/1968 | Blakeslee et al. | 214—83.3 X |

ALBERT J. MAKAY, Primary Examiner

U.S. Cl. X.R.

214—83.32